United States Patent [19]

Spiegel et al.

[11] 4,252,773
[45] Feb. 24, 1981

[54] SAFETY CHEMICAL CARTRIDGE

[76] Inventors: Robert Spiegel; Bill Spiegel, both of 12101 SW. 100 St., Miami, Fla. 33186

[21] Appl. No.: 78,163

[22] Filed: Sep. 24, 1979

[51] Int. Cl.³ .................. B01F 1/00; B65D 55/12; B65D 85/00; E04H 3/20
[52] U.S. Cl. ................................ 422/264; 210/169; 215/208; 215/223; 222/163; 422/310
[58] Field of Search ............ 422/264, 264 B, 274, 422/275, 276, 277, 281, 310, 261; 210/169; 215/205, 208, 214, 217, 218, 223; 222/163

[56] References Cited
U.S. PATENT DOCUMENTS

| | | | |
|---|---|---|---|
| 2,960,247 | 11/1960 | Christie | 215/208 |
| 3,107,156 | 10/1963 | Fredericks | 422/264 B |
| 3,269,576 | 8/1966 | Law | 215/208 X |
| 3,422,977 | 1/1969 | Shaw | 215/208 |
| 3,598,536 | 8/1971 | Christensen | 422/264 B |
| 3,601,274 | 8/1971 | Johnson | 215/208 X |
| 3,608,763 | 9/1971 | Smith et al. | 215/217 |
| 3,677,711 | 7/1972 | Bond | 422/310 X |
| 3,734,332 | 5/1973 | Grulich | 215/223 X |
| 3,827,593 | 8/1974 | Kramb et al. | 215/208 |

Primary Examiner—Joseph Scovronek

[57] ABSTRACT

A safety chemical cartridge for adaptation in an automatic chemical feeder apparatus. The cartridge including a cylinder-like chemical container having an outer surface with first and second ends and a middle portion spaced between the two ends. The container is of a predetermined diameter and includes safety removal means along the outer surface comprising the middle portion of the container including threads having a particular rotational sense; the second end zone defining a enlarged second end zone having a diameter approximately equal to the diameter of the thread structures along the middle portion of the container; additionally, the enlarged second end zone includes a flat portion which is defined by a chord along the second end and extending through the enlarged second end zone; and a barrier is spaced between the threads on the middle portion and the enlarged second end zone; the enlarged second end zone includes a top leading edge which, when in combination with the barrier, forms a second thread portion.

The second thread portion is of an opposite rotational sense to the first threaded portion.

8 Claims, 4 Drawing Figures

SAFETY CHEMICAL CARTRIDGE

FIELD OF THE INVENTION

This invention relates generally to chemical feeders and more particularly to chemical feeders using replacement cartridges wherein the chemical is stored in the cartridge. Applicant's device includes safety means on the cartridge.

BACKGROUND OF THE INVENTION

In the past there have been various types of feeder systems employing a cartridge and feeder. Typically, the cartridge would comprise a container which serves as a storage unit for the chemical. The feeder unit typically contains an inlet and an outlet means for regulating the amount of chemical to be dissolved in the body where the feeder is placed. As is illustrated in the J. W. Christensen patent, U.S. Letters Pat. No. 3,598,536, the container is merely screwed into the feeder apparatus which is then placed in a body of water, such as a pool in order that the amount of chemical dissolved in the pool be regulated to a desired level. Also, illustrating this type of system is W. D. Bond U.S. Letters Pat. No. 3,677,711, wherein there are a plurality of compartment portions in which containers are removably and captivatingly held to accomplish the general objectives as set forth in Christensen. As is illustrated by either of the above patents, little if any attention is paid to the desirability of preventing inadvertent removal by a child or like unknowing individual from coming into contact with a potentially lethal chemical substance in the cartridge.

Typically, the cartridge as described above is screwed into the feeder unit and the chemical is dissolved in the body of water. Before placing the cartridge into the feeder unit a seal is typically removed from the bottom of the cartridge allowing the chemical to make contact with the water once the container is installed in the feeder. Is it at this time when the greatest likelihood for inadvertent contact exists. Generally, small children and like unknowing individuals are allowed within the confines of a pool area. The cartridge inserted in the feeder has the potential for attracting children and other unknowing individuals to examine and possibly play with the feeder unit. Typically a child may try to take apart something which appears to be removably connected. Therefore, in order to efficiently and effectively provide a system for deterring the inadvertent removal of the cartridge with the exposed chemical, a feeder system should be equipped with a safety device which operates when the feeder and the container are in hooked-up relation and when the unit is exposed to the swimmers, including small children or the like and unknowing individuals.

Applicant's invention utilizes a system wherein there is a feeder and a container storing the chemical. The container includes means on the outside surface of the container to deter inadvertent contact of the stored chemical with a child or other unknowing individual. The container may be then placed in a feeder system such as the conventional feeder systems in applicant's figures and the above described patents wherein the feeder system will include an element of the safety removal means and the container itself will contain the major portion of the safety removal means.

While there have been numerous and varying types of safety caps as is illustrated by U.S. Letters Pat. No. 3,827,593, Kramb et al. and U.S. Letters Pat. No. 3,734,332, Grulich, the applicant's search does not reveal any system in which the container itself included the major portion of the safety removal means. For example, in U.S. Letters Pat. No. 2,960,247, Christie, the device having the major portion of the safety removal means was the cap as opposed to a container. The same is illustrated by U.S. Letters Pat. No. 3,269,576, W. J. H. Law, and U.S. Letters Pat. No. 3,601,274, Johnson. Further, it would be impractical for these devices to serve as containers and it is specifically mentioned in the Law U.S. Pat. No. 3,269,576, that these devices are safety closures for containers as opposed to being containers themselves.

Applicant's structure offers the practical advantage that conventional feeder systems would need undergo only minor changes to be readily adapted to applicant's structure. As will be pointed out more fully hereinafter, applicant's structure requires only a thread segment on a conventional container system to be fully adaptable with applicant's safety container. A cap such as the W. J. H. Law cap having major and minor diameters would generally be unsuited for engagement in a conventional feeder system since the feeder system has only one diameter. This points up the general difference between the closure structures and applicant's safety cartridge structure. Within the art of automatic pool feeders and cartridges, it must be remembered that the cartridges are disposable and are continually being removed by the users, whereas the feeder unit is relatively permanent. Thus, the closure systems wherein the cap and the bottle are of generally of the same permanency presents an entirely different set of problems than in the art of chemical feeders. The applicant has specifically devised his device so that it may be readily adaptable to conventional feeders. Thus, the major portion of the safety removable means is on the container rather than the automatic feeder systems which, again, are of a relatively permanent nature. Thus, applicant's device is a relatively simple but very efficient structure which adds safety and practicability to the commercialization of safety removal cartridges.

Moreover, it should be pointed out that applicant regards his invention as a recognition that it is the container itself which should include the safety means rather than to have a cap which prevents the removal of the contents within the container. This is a wide variation and a departure in, generally, an opposite direction than the previous safety devices which were for containers as opposed to the container itself having the safety means. Applicant has further recognized that it is a practical and a commercial advantage to design a safety removal means wherein there is no major and minor diameters as has been generally taught in the previous safety removal closures such as the caps described above.

It is a general object of this invention to provide a safety deterrent means for preventing inadvertent contact of human beings with lethal chemicals by the structure which has been described above and which will be described more fully hereinafter.

SUMMARY OF THE INVENTION

A safety chemical cartridge for adaptation in an automatic chemical feeder apparatus wherein the cartridge comprises a container having a first and second end and a middle portion spaced between the two ends. The container is of a cylinder-like shape and has a predetermined diameter. The container includes an outside surface having safety removal means comprising a double-threaded structure with a barrier inserted between the two threaded structures. The first threaded structure is located at the middle portion and the second threaded structure is located towards the second end and comprises a second end zone. A barrier is inserted between the two threaded structures and the threaded structures have opposite rotational senses. The barrier serves as a means for reversing the rotational sense. Additionally, the container includes a flat portion at the second end zone which, generally, axially spans the second end zone comprising a means for compatibly engaging the feeder unit.

DESCRIPTION OF THE PREFERRED EMBODIMENT

Figure 2:
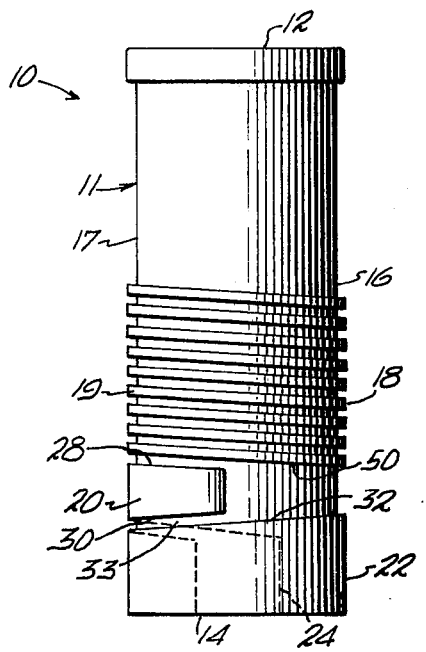
FIG. 2 is a elevational plan view of the instant invention showing the preferred embodiment of the safety removal means.

Referring the drawings wherein like reference characters designate like or corresponding parts throughout the several views and with particular reference to FIG. 2 there is shown the invention generally designated by the numeral 10. The invention comprises a chemical container 11 having a first end 12, a second end 14 and a middle portion 16 spaced therebetween. The middle portion 16 includes safety removal means comprising in the preferred embodiment three elements: (1) a threaded portion 18; (2) a barrier 20; and (3) an enlarged second end zone 22 which includes a flat portion 24 as shown by the dotted line in FIG. 2. The flat portion 24 may be seen more clearly in FIG. 4.

It will be readily appreciated to those skilled in the art that the threaded portions comprise threaded means wherein there may be slots or steps as opposed to threads which circumferentially surround the cylinder-like structure shown in FIG. 2. It will also be readily appreciated by those skilled in the art that these threaded means are meant to be read broadly to include such structures.

The threaded portion 18 is of a particular rotational sense. In the preferred embodiment, as shown in FIG. 2, it is a left-handed thread. Thus when the container 11 is rotated in a clockwise manner the container 11 will proceed upward against a thread segment as will be explained more fully hereinafter. Likewise, it will be readily appreciated by one skilled in the art that the threads could also be right-handed threads without affecting the inventive concept embodied herein.

Figure 4:
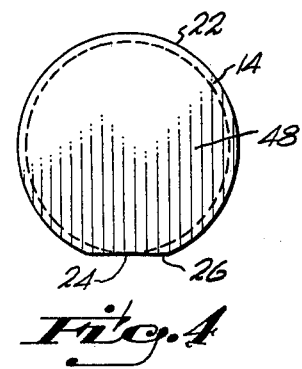
FIG. 4 is a bottom plan view of the instant invention showing one element of the safety removal means of the preferred embodiment shown in FIG. 2.

The container includes a second end zone 22 having an enlarged diameter shown clearly in FIG. 2 and 4. It will also be noted that the diameter of the enlarged second end zone 22 should be approximately equal to the diameter of the threads 18. However, it will be readily appreciated by those skilled in the art that the diameters of the two may slightly vary and still embody the basic invention as set forth herein as long as the diameters of each are generally equal.

As can be seen in FIG. 2, the second end zone 22 includes a flat portion 24 which is shown in dotted lines in FIG. 2. The flat portion 24 is defined by a chordal line 26 which extends across the second end 14.

The container safety removal means includes a barrier 20 spaced between the threaded portion 18 and the enlarged second end zone on the outer surface 17 of the container as shown in FIG. 2. The barrier 20 may include a top leading edge such as at 28 which is shown in the preferred embodiment as being relatively parallel to the threads 19 of threaded portion 18. Of course, it will be readily appreciated by those skilled in the art that the invention embodied herein does not require that the leading edge 28 be parallel to the threads although it is believed that that is the best mode of the invention. The barrier 20 also includes a bottom leading edge 30 which may, as is shown in the preferred embodiment, be generally parallel to the leading edge 32 of the second end zone. The two leading edges 30 and 32 comprise a second threaded portion 33 which is shown as a right-handed thread. As previously noted, the direction of a particular thread does not affect the embodiment of the inventive concept herein and it must be pointed out that either threaded structure could be of either rotational sense as long as each threaded structure is of an opposite rotational sense. As is apparent from the above description, the barrier 20 serves a means for changing the rotational direction of the cannister, the function of which will more apparent as explained in the usage section.

As is apparent from the drawings, the barrier 20 may define a circumferential "C-shaped" barrier as shown in FIG. 2. The chordal flat portion 24 may fall directly under the barrier 20 or partially under the barrier 20 as shown in the figures.

Figure 1:
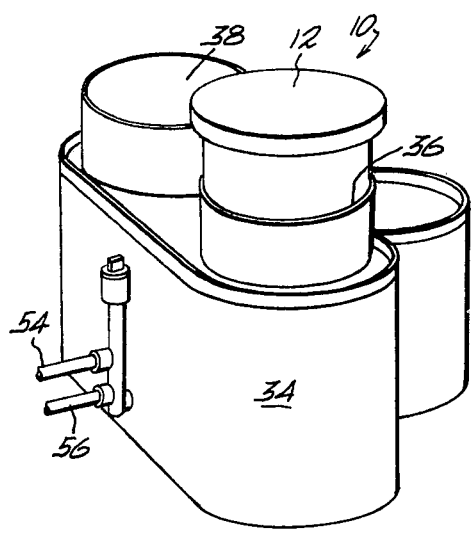
FIG. 1 is a perspective view of the invention in an automatic chemical feeder.
Figure 3:
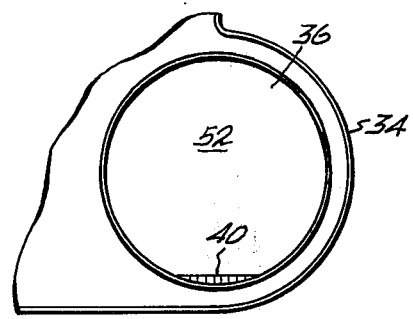
FIG. 3 is a top partially broken-away view of the compartment portion showing the compatible safety removal means of the preferred embodiment shown in FIG. 2.

With particular reference to FIG. 1 there is shown the instant invention 10 removably captivated in an automatic chemical feeder 34. The feeder serves a frame means which, as depicted in the preferred embodiment, may include two compartment portions 36 and 38 each able to contain a container of the type embodied in this invention. The compartment portions, either one or both, may include a compatible safety removal means such as the one shown in FIG. 3 and designated by the numeral 40 comprising a thread segment. As seen in FIG. 3, a top partial view of the compartment portion 36 of the automatic chemical feeder 34, a thread segment 40 is provided along the inside surface of the compartment portion. The thread segment is designed and shaped to be compatible with the flat portion 24 of the container 11. As will be seen in the description set forth hereinafter, the flat portion is compatible with the thread segment and forms the means for linking and removably captivating the container 11 within the feeder 34.

Preferred Mode of Usage

The instant invention 10 conventionally includes a seal such as at 48 on the second end zone as shown in FIG. 4. Once the seal is removed the chemicals are exposed. At that point, the instant invention 10 is placed in an automatic type chemical feeding apparatus such as 34. The flat portion 24 and the thread segment 40 are aligned by rotating the container 11. As a result of normal gravitational forces the container 11 slips along the flat portion 24 past the thread segment 40 until the thread segment 40 reacts with the bottom leading edge 30 of the barrier 20. The cannister 10 is rotated until the thread segment slides past barrier 20. This is done by rotating the cannister in the preferred embodiment in a clockwise manner so that the cannister slides past barrier 20 and the bottom leading edge of thread segment 18, indicated by numeral 50, rests on the thread segment 40. The device is then rotated in an opposite rotational sense and is secured into position and spaced a predetermined distance from floor 52 of the feeder 34.

The feeder 34 includes an inlet such as 54 wherein water flows through the feeder and mixes with a predetermined amount of chemical in the compartment portion such as at 36. and 38. The inward flow of water continues until it is forced through the outlet 56 wherein the predetermined amount of chemical dissolved in the water then mixes with the general body of water thus regulating the amount of chemical in the body of water.

As is conventional with such feeder systems, the container may be rotated closer or farther away from the floor to provide for a greater or lesser amount of substance in the container flowing out. That conventional feature has been continued in applicant's invention.

When the container's chemicals have been exhausted, the container is removed. In order to remove the container, the opposite rotational steps to those described previously are taken. With the respect the preferred embodiment, the container 11 would first be rotated in a clockwise manner until the barrier 20 slipped past the thread segment 18 and would be engaged into the second threaded portion 33 and then rotated in an opposite rotational sense. The the container would be rotated in a counterclockwise manner until the flat portion 24 and the thread segment 40 were aligned. At that point, the container 11 would simply be lifted up and removed from the compartment portion [36, 38]. Another container would then be installed as described above.

The steps described above would normally deter one not familiar with the dangers of chemicals and in particular a chemical such as chlorine which may be deadly or in any event cause great bodily harm when contacted to the skin or inhaled by a person. Normally one of either diminished capacity or a small child unable to understand the dangers of chemicals would be able to screw and lift out a conventional cannister containing the potentially lethal gas. However, the same person would not be likely to be able to rotate the container using applicant's safety means in two separate directions and lifting at the proper time in order to remove the container from its relatively safe mooring feeder unit. If a person was unable to follow the steps as described above, the container would simply be turned and turned without ever being able to disengage it from the feeder unit. The continuation of the rotational movement would not hurt the container or enable the person of diminished capacity or a small child to remove it from the feeder unit where it is relatively safe. However, one knowledgeable in the use of chemicals and aware of the dangers would ordinarily be expected to be able to read directions where it would be a simple matter to merely turn the container 11 in two separate directions, lifting at the proper time and then being able to remove the container after aligning the flat portion with the thread segment as previously described above. Thus, applicant has provided a device which will deter inadvertent contact of a potentially lethal chemical with a person of either diminished capacity or a small child in a simple, efficient and commercially practical structure that can be used by one now using the conventional feeder systems with only minor modifications.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A safety chemical cartridge for adaptation in a automatic chemical feeder apparatus, the apparatus comprising:
    a cylinder-like chemical container means having an outer surface with first and second ends and a middle portion spaced between the two end, the container having a predetermined diameter and including safety removal means comprising:
        the middle portion of the container having a first thread means with a predetermined diameter, the diameter of the thread means being slightly greater than the diameter of the container,
        an enlarged second end zone adjacent the second end of the container having a diameter approximately equal to the diameter of the thread means, the second end including a chord wherein the chord defines a flat portion on the second end zone, and
        a barrier between the second end zone and the first thread means, the barrier having a predetermined diameter approximately equal to the diameter of the thread means, the barrier including a first leading edge adjacent the middle portion thread means and a second leading edge adjacent the second end zone, the combination of the second leading edge and the enlarged second end zone defining a second thread means, and
    the first thread means being of one rotational sense and the second thread means being of an opposite rotational sense.

2. A chemical feeder apparatus comprising, in combination with the cartridge of claim 1, a frame means for removably captivating the container,
    the frame means including a compartment portion and inlet and outlet means, the compartment portion including a floor and safety removal means spaced a predetermined distance from the floor, the safety removal means being compatible with the container safety removal means and with the safety chemical cartridge in captivating and removable engagement with the frame means.

3. The apparatus as defined in claim 2 wherein the frame safety removal means comprises a chord spaced a predetermined distance from the frame means floor, the chord defining a thread segment.

4. The cartridge as defined in claim 1 wherein the barrier comprises thread reversal means and wherein the barrier is "C" shaped having a circumferential length approximately half the diameter of the container and being directly aligned with the flat portion of the container.

5. The cartridge as defined in claim 4 wherein the barrier is partially aligned with the container flat portion.

6. The cartridge as defined in claim 5 wherein the container includes removable seal means spanning the second end.

7. The cartridge as defined in claim 6 wherein the container chemical is chlorine supplying.

8. The apparatus as defined in claim 2 wherein the diameter of the thread means, the diameter of the barrier portion and the diameter of the enlarged second end zone are equal and wherein the diameter of the compartment portion is slightly greater than the diameter of the thread means, barrier and enlarged second end zone.

* * * * *